Patented May 23, 1933

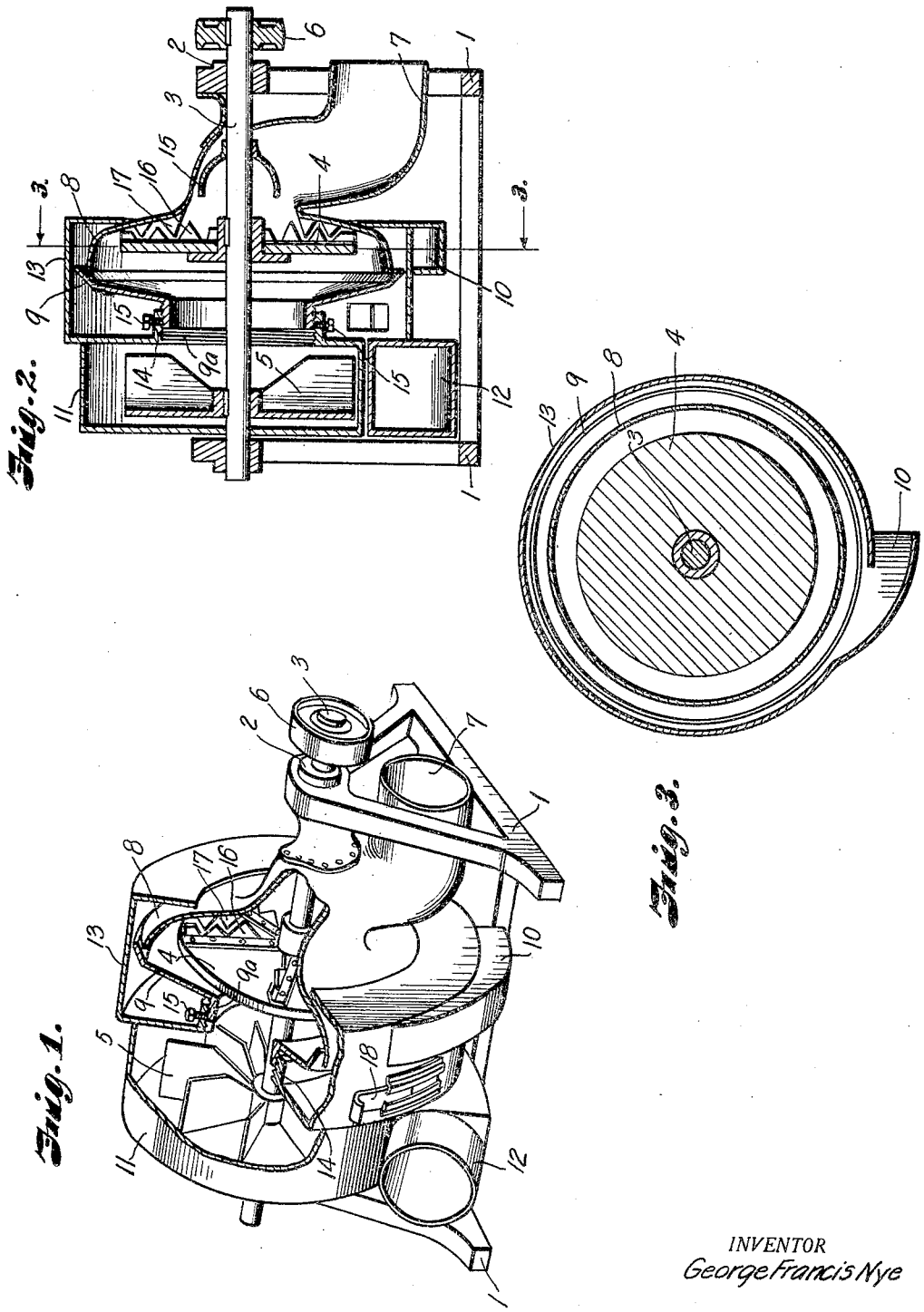

1,910,356

UNITED STATES PATENT OFFICE

GEORGE FRANCIS NYE, OF KEARNEY, NEBRASKA

THRESHING UNIT

Application filed August 6, 1930. Serial No. 473,337.

This invention relates to improvements in combine threshing and separating machinery, and refers more particularly to a centrifugal machine similar in type to that described in my previous Patent 1,670,273, wherein separation of the grain from the chaff and straw is obtained by opposing and controlling the centrifugal throw of a disk threshing element by means of an air blast.

It is intended in the manufacture of the device hereinafter described, to use the machine as a stationary machine and mount it on a truck with or without a power unit, or use the machine in combination in a power assembly in connection with a combine harvester. It is contemplated, also, that the machine may be mounted upon a portable bed or platform and the power unit for driving the machine connected so as to furnish power for moving the assembly from place to place.

In connection with its use in a combine harvester, it is contemplated that the combine will be drawn by a tractor to harvest, thresh and separate the standing grain.

The threshing device is constructed so that the threshing and separation is accomplished by movable parts rotated upon a single shaft. These movable parts are a threshing disk and suction fan enclosed in a continuous housing.

Among the important objects of the present invention are to provide a threshing and separating unit in connection with which there is furnished an adjustable cone which facilitates the separation of the grain kernels from the chaff and straw.

Fig. 1 is a perspective view of the unit with parts broken away.

Fig. 2 is a longitudinal cross section.

Fig. 3 is a transverse cross section on the line 3—3 in Fig. 2.

Referring to the drawing, the assembly is supported by triangular standards 1, which carry the bearings 2, supporting the shaft 3. Upon this shaft is rigidly mounted a threshing disk 4, a suction fan 5 and a driving pulley 6. Power may be supplied to the unit by belt connections through the pulley 6 or the shaft 3 may be direct connected to a source of power not shown, such as an internal combustion engine, electric motor, or other power source. When the shaft 3 is rotated, the air blast from the suction fan draws the unthreshed grain into the conveyor pipe 7, which is an extension of a bell cone 8. This bell cone serves as a combine stationary threshing element, a suction intake tube, and a casing for directing the discharge of the threshed grain projected from the threshing disk. The velocity of the grain projected from the disk 4 follows the surface of the cone 8 to the adjustable cone 9, where its direction is changed by the outer curvature of the periphery of the cone 9 so that the grain kernels pass through an annular space between the cones 8 and 9 and are discharged into a grain collecting duct or grain discharger 10.

The chaff and straw follows the receiving cone 9 and is drawn by means of the fan suction 5 into the fan housing 11 and is discharged through the pipe 12. Between the housing 13 surrounding the threshing disk 4 and the fan housing 11 is a threaded collar 14 which accommodates the threaded portion 9a of the adjustable cone 9. A set screw 15 serves to hold the adjustable collar fixedly in place. Any suitable means for holding the cone in position may be used. A set screw is shown in the interest of simplicity.

The mounting of the cone 9 in this manner permits the cone to be screwed ahead or backed off to the desired degree in order to control the size of the annular space between the cones 8 and 9. The narrowing and widening of the annular space permits a regulation of the effectiveness of the separation of the chaff and straw from the grain kernels. Also, it has been found that, with different types of grain, the widening and narrowing of the annular space is essential to procure the desired results. When the annular space is narrow there is very little air blast to oppose the grain kernels which are discharged through the annular space. When the annular space is widened, there is an increase of air suction opposing the grain discharge.

The crop which is introduced through the inlet 7 is advanced to the threshing disk by means of the prongs 15 mounted upon the shaft 3. Projections 16 mounted upon the disk 4 are staggered with like projections 17 on the cone 8 so that the crop is threshed between these projecting elements. The grain separated from the chaff and straw follows the curvature of the cone 8 and, being the heaviest material, acquires the highest lineal velocity due to the centrifugal force of the disk. The chaff and straw, consisting of relatively lighter materials, is drawn around the end of the disk by the suction of the fan, and receiving less velocity due to the centrifugal force of the disk, is not projected with the velocity of the grain from the disk. Naturally it follows the path of the air suction more directly and is drawn into the fan housing and discharged through the pipe 12 while the heavier grain, whose centrifugal force overcomes the air suction of the fan, follows the path of the cone 8 and adjustable cone 9, to be discharged into the grain duct 10, thence to any suitable storage.

On the periphery of the housing 13 are sliding doors 18 which permit the adjustment of the cone 9 without disassembling the unit.

It is appreciated that many changes may be made in the form and construction of the threshing and air suction elements, also in the air blast control means in the separation chamber without departing from the spirit and scope of the invention.

The simplicity of the device and the cheapness of manufacturing costs, the ease and maintenance and inexpensive upkeep are all advantages of importance. Furthermore, the small amount of power required to operate the unit, its compactness and its adaptability for separation of chaff and straw from all types of grain adapt the unit for use upon large, as well as small farms.

I claim as my invention:

1. A centrifugal threshing machine comprising in combination a housing, a shaft rotatably mounted within said housing, a member mounted on said shaft provided with threshing elements, threshing elements mounted on said housing for co-action therewith, said member threshing a crop and imparting centrifugal momentum to the threshed mass in a direction intersecting the axis of said shaft, a suction fan mounted on said shaft adapted to create an air stream of sufficient velocity to overcome the momentum of the chaff while insufficient to affect that of the grain and a fixed annular baffle plate mounted within said housing between said fan and said member adapted to assist the air stream in effecting a separation of the grain and the chaff.

2. A threshing machine as in claim 1 in which said housing is provided with a second annular baffle plate positioned around said member and adjacent to said first baffle plate forming a circuitous grain discharge passageway therewith.

3. A threshing machine as in claim 1 in which said housing is provided with a second annular baffle plate positioned around said member and adjacent to said first baffle plate to form a circuitous grain discharge passageway therewith and means for mounting said first baffle plate enabling it to be adjusted axially to vary the size of said passageway.

In testimony whereof I affix my signature.

GEORGE FRANCIS NYE.